Nov. 29, 1938.  J. W. HEASTON  2,138,698
CRANKPIN
Filed Nov. 19, 1937
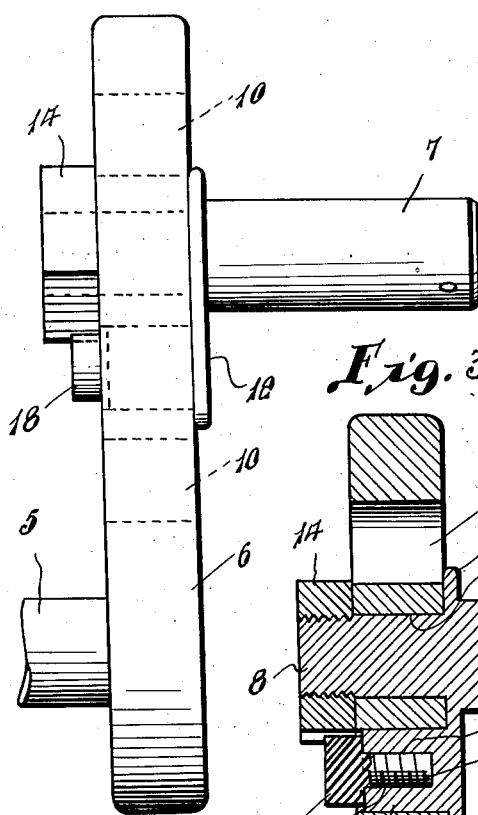
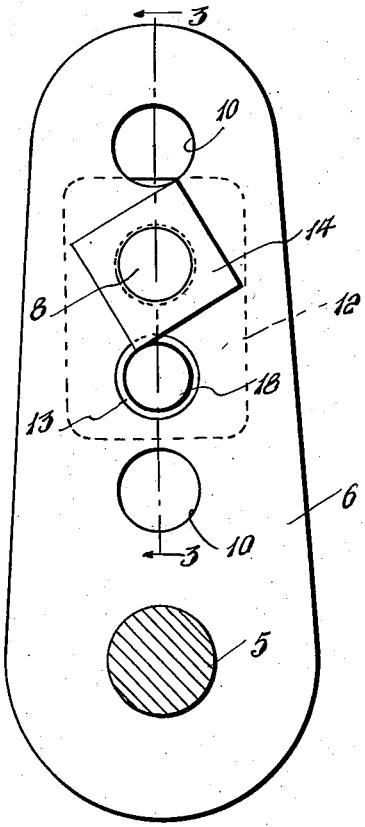
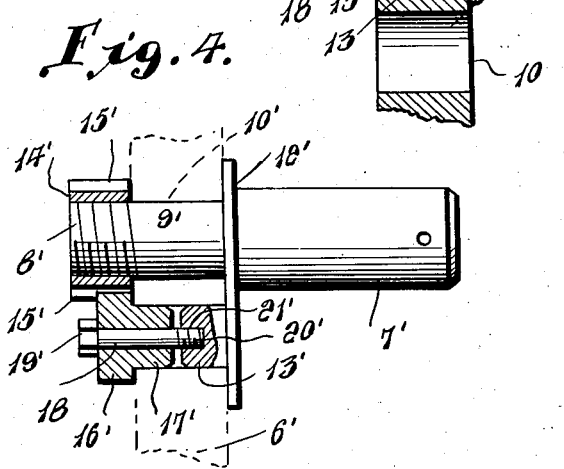
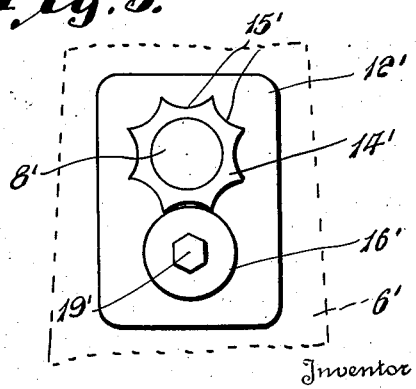
Inventor
J. Heaston
By
Attorneys Patented Nov. 29, 1938

2,138,698

UNITED STATES PATENT OFFICE 2,138,698

CRANKPIN

John W. Heaston, Huntington Beach, Calif.

Application November 19, 1937, Serial No. 175,524

2 Claims. (Cl. 74—600)

This invention relates to improvements in crank pins of the adjustable type more particularly adapted for use in connection with oil wells or drilling apparatus wherein motion is imparted to a walking beam by means of a crank arm for the purpose of reciprocating the drill rod attached to the opposite end of the walking beam.

The primary object of this invention is to provide a device of the above mentioned character including a crank arm and a crank pin connection therewith which will prevent the crank pin from rotating relative to the crank arm and will lock the crank pin securely to the crank arm.

A further object of this invention is to provide an extension on the crank pin having a stub shaft adapted to enter a supplementary opening formed in the crank arm whereby a locking screw may be seated in the stub shaft to prevent rotation of the locking nut of the crank pin.

A further object of this invention is to provide a connection between a crank pin and crank arm in which the crank pin is primarily held in place by means of a nut threaded on the end of the crank pin which extends through the crank arm and means for preventing the rotation of a nut carried by a removable extension on the crank pin.

Other objects and advantages of the invention will become apparent during the course of the following description, taken with the drawing, wherein, Figure 1 is a side elevational view of the device embodying this invention illustrating the crank pin attached to the crank arm and showing the manner in which the locking nut is held in place by the detachable screw seated in the supplementary stub shaft;

Figure 2 is a front elevational view of the device embodying this invention illustrating the locking nut in position and showing the locking screw for preventing rotation thereof;

Figure 3 is a vertical cross-sectional view taken on line 3—3 of Figure 2, looking in the direction of the arrows, illustrating the details of construction and illustrating further the manner in which the locking nut on the crank pin is held in place by means of the set screw;

Figure 4 is a modified form of the invention, illustrating in cross-section a crank pin having a different lock nut and showing a modified form of nut locking means; and Figure 5 is a front elevational view of a modified form of the invention, illustrating the configuration of the locking nut and the supplementary nut locking device.

In the drawing, wherein for the purpose of illustrating the invention and wherein like reference characters will be employed to designate like parts throughout the same, the reference character 5 will generally be employed to designate a motor driven shaft to the end of which is connected a crank arm 6 of usual construction.

The invention comprises a wrist pin 7 having a threaded end 8 reduced as at 9 for being received in one of a series of openings 10 formed in the crank arm 6. It is the usual practice to form a series of openings 10 in the crank arm 6 so that the crank pin 7 may be adjusted to produce variations in the throw of the walking beam. Formed integral with the crank pin 7 adjacent the screw threaded end 8 is a plate 12 having formed on the end thereof a supplementary stub shaft 13 which is also adapted to enter one of the openings 10 so that rotation of the crank pin 7 relative to the crank shaft 6 may be prevented.

In order to hold the crank pin 7 in place within one of the openings 10 of the crank arm 6, a nut 14 is threaded on the threaded end 8 and is tightened in place as shown in Fig. 3. Means is provided for preventing the rotation of the nut 14 after the same has been screwed in place and includes a machine screw 15 having a threaded shank 16 adapted to be received in a correspondingly shaped opening 17 formed in the supplementary stub shaft 13 and said screw 15 is provided with a rounded head 18 adapted to engage the corners of the locking nut 14 to prevent rotation thereof with the resultant loosening or displacement of the crank pin 7.

It will be noted that the rounded head 18 of the screw 15 may be seated within the opening 17 after the locking nut 14 has been threaded on the end of the wrist pin 7 and it is proposed to use a Stillson-type wrench to seat the screw 15.

Once the screw 15 has been seated in the threaded opening 17 it will be impossible to remove it unless a Stillson wrench is used, thereby preventing unauthorized persons from tampering with the chank nut locking device.

In Figures 4 and 5, a modified form of the invention is shown and comprises a crank arm 6' similar to the crank arm shown in Figures 1 to 3 inclusive to which is attached a crank pin 7' having a reduced end 9' threaded as at 8'.

Also formed integral with the crank pin 7' is a locking plate 12' having a supplementary stub shaft 13' adapted to enter one of the openings 10' in the crank arm 6' similar to the adjustment openings 10 shown in Figures 1 to 3 inclusive. Threaded on the screw threaded end 8' of the wrist pin 7' is a nut 14' having a series of curved cut-away portions 15' for receiving a locking device which will be hereinafter more fully described.

The locking device comprises a disk-shaped member 16' having a reduced portion 17' adapted to also enter the opening 10' in alignment with the supplementary stub shaft 13'. After the reduced portion 17' of the disk-shaped member 16' is inserted in the opening, it may be held in place by means of a bolt 18' having a head 19' at one end and a screw threaded end 20' formed on the other end adapted to enter an internally screw threaded opening 21' formed in the end of the supplementary stub shaft 13'.

It will be noted that the disk-shaped portion 16' is received in the cut-away portions 15' of the locking nut 14' to prevent rotation thereof and to prevent the displacement of the wrist pin 7'.

It is to be understood that the form of the invention herewith shown and described is to be taken as the preferred embodiment of the same and that various changes in the shape, size and arrangement of parts may be resorted to without departing from the spirit of the invention or the scope of the subjoined claims.

I claim:—

1. In a device of the character described, comprising a crank arm having a series of adjusting openings therein, a crank wrist pin having a reduced threaded end adapted to be selectively inserted in one of the openings, an extension formed on the wrist pin adjacent the reduced threaded end, a supplementary stub shaft formed on the extension, said stub shaft being adapted to enter one of the other openings in the crank arm, a nut having side facets threaded on the reduced screw threaded portion of the wrist pin, and a locking device removably carried by the supplementary stub shaft for engaging one of the facets of the nut and preventing rotation of the nut relative to the wrist pin.

2. A device of the character described, comprising a crank arm having a series of adjusting openings therein, a wrist pin having a reduced threaded end adapted to be received in one of the openings in the crank arm, an extension formed on the wrist pin, a supplementary stub shaft formed on the extension parallel to the wrist pin and being adapted to enter one of the other openings in the crank arm, and terminate inwardly of the ends of said opening, a nut threaded on the reduced threaded end of the wrist pin and having kerfs in the side edges thereof, a disk-shaped member having a reduced shank adapted to be received in the other end of the opening having the stub shaft therein, a head bolt passing through the disk-shaped member and threaded into the adjacent end of the stub shaft and said disk-shaped member being in position relative to the locking nut for being received in a kerf in the side wall of the nut.

JOHN W. HEASTON.